United States Patent
George et al.

(10) Patent No.: US 9,569,278 B2
(45) Date of Patent: Feb. 14, 2017

(54) ASYMMETRIC PERFORMANCE MULTICORE ARCHITECTURE WITH SAME INSTRUCTION SET ARCHITECTURE

(75) Inventors: Varghese George, Folsom, CA (US); Sanjeev S. Jahagirdar, Folsom, CA (US); Deborah T. Marr, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1172 days.

(21) Appl. No.: 13/335,257

(22) Filed: Dec. 22, 2011

(65) Prior Publication Data

US 2012/0198207 A1    Aug. 2, 2012

(51) Int. Cl.
G06F 9/50    (2006.01)
G06F 1/32    (2006.01)

(52) U.S. Cl.
CPC ........... G06F 9/5094 (2013.01); G06F 1/3206 (2013.01); G06F 1/3293 (2013.01); Y02B 60/121 (2013.01); Y02B 60/142 (2013.01)

(58) Field of Classification Search
CPC ............................. G06F 1/3293; G06F 1/3296
USPC ...................................................... 712/32, 43
See application file for complete search history.

(56) References Cited

U.S. PATENT DOCUMENTS

| | | |
|---|---|---|
| 7,992,020 B1 | 8/2011 | Tuan et al. |
| 2006/0095807 A1 * | 5/2006 | Grochowski et al. ........ 713/324 |
| 2006/0282692 A1 * | 12/2006 | Oh ................................. 713/300 |
| 2008/0127192 A1 * | 5/2008 | Capps .................... G06F 1/3203 718/103 |
| 2008/0288748 A1 * | 11/2008 | Sutardja et al. ................ 712/20 |
| 2009/0055826 A1 * | 2/2009 | Bernstein .............. G06F 9/3891 718/102 |
| 2009/0271646 A1 * | 10/2009 | Talwar .................. G06F 1/3203 713/322 |
| 2009/0307512 A1 * | 12/2009 | Munjal ..................... G06F 1/30 713/324 |
| 2009/0328055 A1 * | 12/2009 | Bose ..................... G06F 1/3203 718/105 |
| 2010/0058086 A1 | 3/2010 | Lee |
| 2010/0083011 A1 | 4/2010 | Onouchi et al. |
| 2010/0131781 A1 * | 5/2010 | Memon ................. G06F 1/3209 713/310 |
| 2010/0153954 A1 * | 6/2010 | Morrow et al. ............. 718/102 |
| 2011/0239015 A1 * | 9/2011 | Boyd .................... G06F 1/3203 713/320 |
| 2011/0252260 A1 * | 10/2011 | Flachs .................. G06F 1/3287 713/324 |

(Continued)

OTHER PUBLICATIONS

Aruj, Ori. "Evolution: 20 years of switching fabric". Sep. 2008. EE Times. Retrieved from http://www.eetimes.com/document.asp?doc_id=1272140.*

(Continued)

Primary Examiner — Eric Coleman
(74) Attorney, Agent, or Firm — Nicholson De Vos Webster & Elliott, LLP

(57) ABSTRACT

A method is described that entails operating enabled cores of a multi-core processor such that both cores support respective software routines with a same instruction set, a first core being higher performance and consuming more power than a second core under a same set of applied supply voltage and operating frequency.

20 Claims, 8 Drawing Sheets

(56) References Cited

U.S. PATENT DOCUMENTS

2012/0117403 A1* 5/2012 Bieswanger .......... G06F 1/3206
　　　　　　　　　　　　　　　　　　　　713/322

OTHER PUBLICATIONS

PCT International Search Report for PCT Counterpart Application No. PCT/US2012/068274, 5 pgs., (Feb. 22, 2013).
PCT Written Opinion of the International Searching Authority for PCT Counterpart Application No. PCT/US2012/068274, 6 pgs., (Feb. 22, 2013).
PCT Notification concerning Transmittal of International Preliminary Report on Patentability (Chapter I of the Patent Cooperation Treaty) for PCT Counterpart Application No. PCT/US2012/068274, 8 pgs., (Jul. 3, 2014).
Notice of Allowance from TW counterpart Application No. 101147200, ,, Mailed Sep. 29, 2014, 1 page.

* cited by examiner

US 9,569,278 B2

ASYMMETRIC PERFORMANCE MULTICORE ARCHITECTURE WITH SAME INSTRUCTION SET ARCHITECTURE

BACKGROUND

Field of Invention

The field of invention relates generally to computing system architecture, and, more specifically, to an asymmetric performance multicore architecture with same instruction set architecture (ISA).

Background

FIG. 1 shows a typical multi-core processor 100_1. As observed in FIG. 1, the multi-core processor 100_1 includes a plurality of processor cores 101_1 to 101_N on a same semiconductor die 100_1. Each of the processor cores typically contain at least one caching layer for caching data and/or instructions. A switch fabric 102 interconnects the processor cores 101_1 to 101_N to one another and to one or more additional caching layers 103_1 to 103_N. According to one approach, the processors 101_1 to 101_N and the one or more caching layers have internal coherency logic to, for example, prevent two different cores from concurrently modifying the same item of data.

A system memory interface (which may also include additional coherency logic) 104 is also included. Here, if a core requests a specific cache line having a needed instruction or item of data, and, the cache line is not found in any of the caching layers, the request is presented to the system memory interface 104. If the looked for cache line is not in the system memory 105_1 that is directly coupled to interface 104, the request is forwarded through system network interface 106 to another multi-core processor to fetch the desired data/instruction from its local system memory (e.g., system memory 105_X of multi-core processor 100_X). A packet switched network 107 exists between the multi-processor cores 100_1 to 100_X to support these kinds of system memory requests.

Interfaces to system I/O components 108_1 to 108_Y (e.g., deep non volatile storage such as a hard disk drive, printers, external network interfaces, etc.) are also included on the multi-processor core. These interfaces may take the form of high speed link interfaces such as high speed Ethernet interfaces and/or high speed PCIe interfaces.

Some multi core processors may also have a port 105 to the switch fabric 102 to scale upwards the number of processor cores associated with a same (also scaled upward) caching structure. For example, as observed FIG. 1, multi-processor cores 101_1 and 101_2 are coupled through the switch fabric port 105 to effectively form a platform of 2N cores that share a common caching structure (processor 100_2 is coupled to processor 100_1 through a similar port to its switch fabric).

BRIEF DESCRIPTION OF THE DRAWINGS

The present invention is illustrated by way of example and not limitation in the figures of the accompanying drawings, in which like references indicate similar elements and in which.

DETAILED DESCRIPTION

Overview

Detailed Description

Computing system power consumption is becoming more and more of a concern. As such, a number of different power management schemes are incorporated into modern day computing systems. Typically, the power management component of the system will scale up the processing performance of the system as the system's workload increases, and, scale down the processing performance of the system as the system's workload decreases. Decreasing the processing performance of the system corresponds to power savings as the power consumption of the system is strongly correlated with its performance capabilities.

A typical way to scale processing performance and power consumption with workload is to enable/disable entire cores and raise/lower their supply voltages and operating frequencies in response to system workload. For example, as observed in FIG. 2, under a maximum performance and power consumption state 201 all cores are enabled and each core is provided with a maximum supply voltage and maximum clock frequency. By contrast, under a minimum performance and power consumption state 202 (at which program code can still be executed), only one core is enabled. The single core is provided with a minimum supply voltage and minimum operating frequency.

Figure 3:
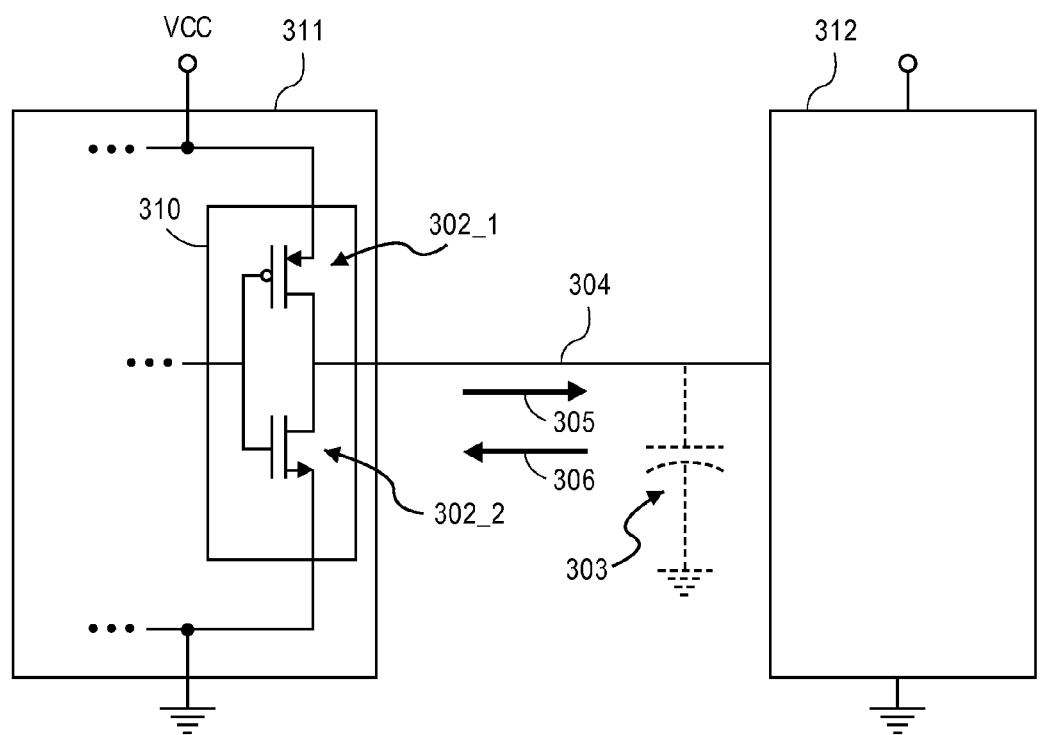
FIG. 3 shows a logic gate drive circuit.

Some basic concepts of electronic circuit power consumption are observed in FIG. 3. Here, the driver circuit 310 portion of a logic gate 311 is observed driving a next one or more logic gate(s) 312. Specifically, the speed of operation of interconnected logic gates 311, 312 rises as the width of its driving transistors 302_1, 302_2 (measured, for each transistor, along the semiconductor surface perpendicular to the direction of current flow) increase and the capacitance 303 of the line 304 (and input capacitance of the load logic gate(s) 312) it is driving decreases. Here, in order to raise the voltage on the line from a logic low level to a logic high level, a sufficiently strong current 305 needs to be driven by the source transistor 302_1 through the line to rapidly apply charge to the capacitance 303 (and thereby raise the voltage on the line). Similarly, in order to lower the voltage on the line from a logic high level to a logic low level, a sufficiently strong current 306 needs to be "sunk" by the sink transistor 302_2 through the line to rapidly draw charge off the capacitance (and thereby lower the voltage on the line).

Essentially, the amount of current the transistors 302_1, 302_2 will source/sink is a function of their respective widths. That is, the wider the transistors are, the more current they will source/sink. Moreover, the amount of current the transistors 302_1, 302_2 will source/sink is also a function of the supply voltage VCC that is applied to the driver circuit 310 observed in FIG. 3. Essentially, the higher the supply voltage, the stronger the source/sink currents will be.

Further still, the rate at which the transistors will be able to apply/draw charge to/from the capacitor is a function of the size of the capacitance 303 of the line 304 being driven. Specifically, the transistors will apply/draw charge slower as the capacitance 304 increases and apply/draw charge faster as the capacitance 304 decreases. The capacitance 304 of the line is based on its physical dimensions. That is, the capacitance 304 increases the longer and wider the line, and by contrast, the capacitance 304 decreases the shorter and narrower the line is. The line itself is of fixed dimensions once the circuit is manufactured. Nevertheless, line width and line length are design parameters that designers must account for. The width of the line cannot be narrowed too much or else it will have the effect of increasing the line's resistance which will also slow down the rate of charge applied/drawn to/from the capacitor.

A final speed factor is the frequency of the signal itself on the line. Essentially, circuits driven with a faster clock signal will more rapidly switch between applying and drawing charge to/from the line capacitance 304 than circuits with a slower clock signal. Here, more rapid switching corresponds to a circuit that is sending binary information faster.

All of the factors described above for increasing the rate at which the charge on the capacitor is applied/drawn also lead to a circuit that consumes more power. That is, a circuit that is designed to have relatively wide source/sink transistors, a high supply voltage, short load lines and receive a higher frequency clock signal will operate faster and therefore consume more power than circuits oppositely oriented as to these same parameters.

Figure 1:
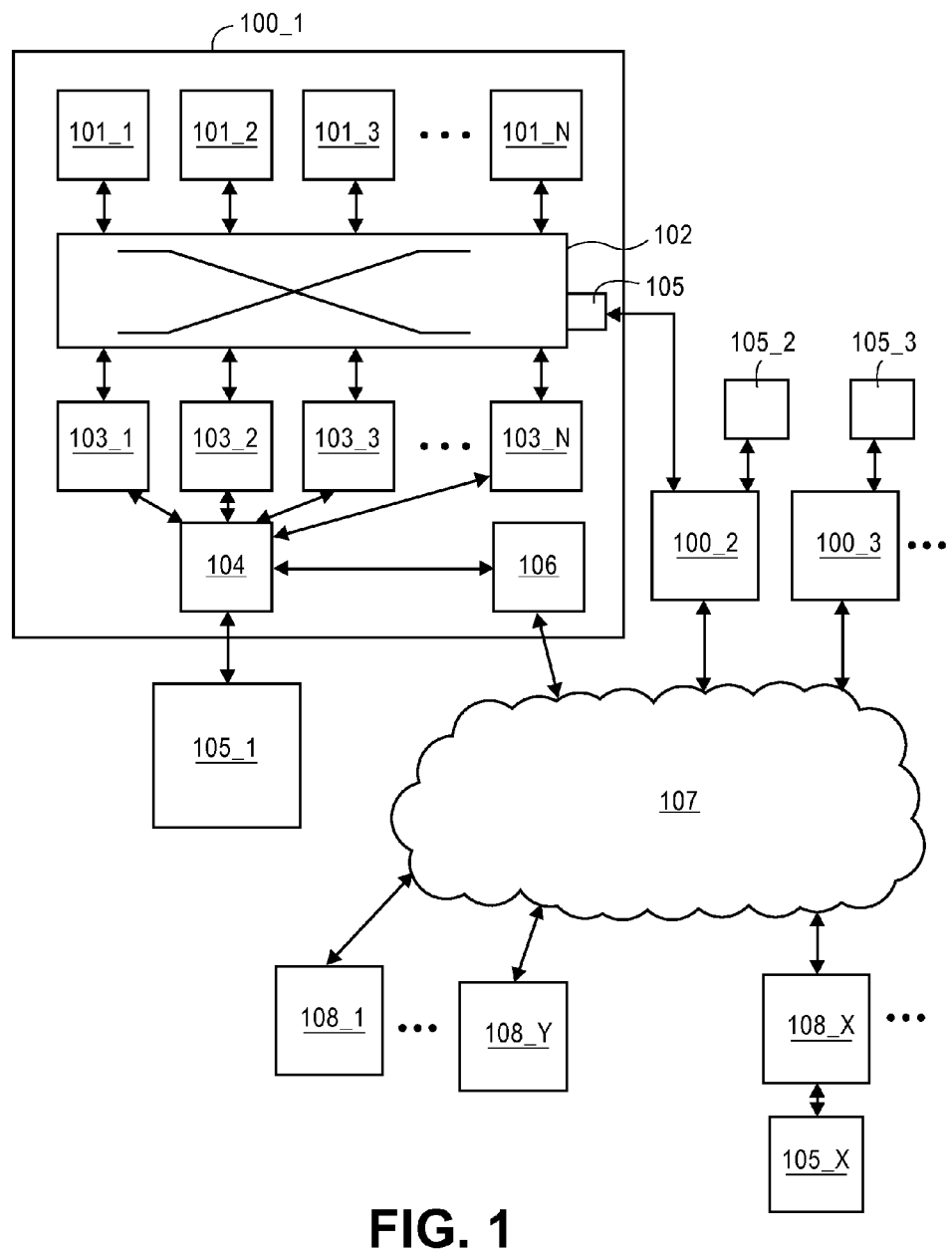
FIG. 1 shows a multicore processor and surrounding computer system (prior art)
Figure 2:
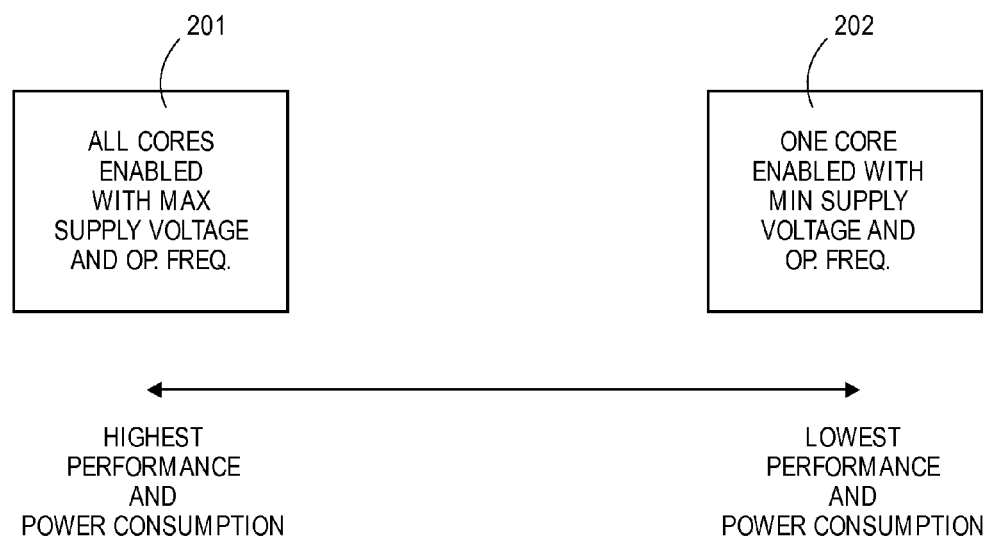
FIG. 2 shows a power management strategy (prior art)

Recalling the discussion of FIGS. 1 and 2, note that prior art multi core processor power management schemes have been implemented on processors whose constituent cores are identical. That is, referring to FIG. 1, all of cores 101_1 to 101_N are identical in design. In other approaches, the cores are not identical but are radically different. Specifically, one of the cores is a low power core but the lower power characteristic is achieved by stripping out sizable chunks of logic circuitry as compared to the other cores. More specifically, the sizable chunks that are stripped out correspond to the logic that executes the program code instructions. Said another way, the low power core supports a reduced instruction set as compared to the higher performance cores. A problem with this approach, however, is that it is difficult for system software to adjust switch operation between processor cores having different instruction sets.

Figure 4:
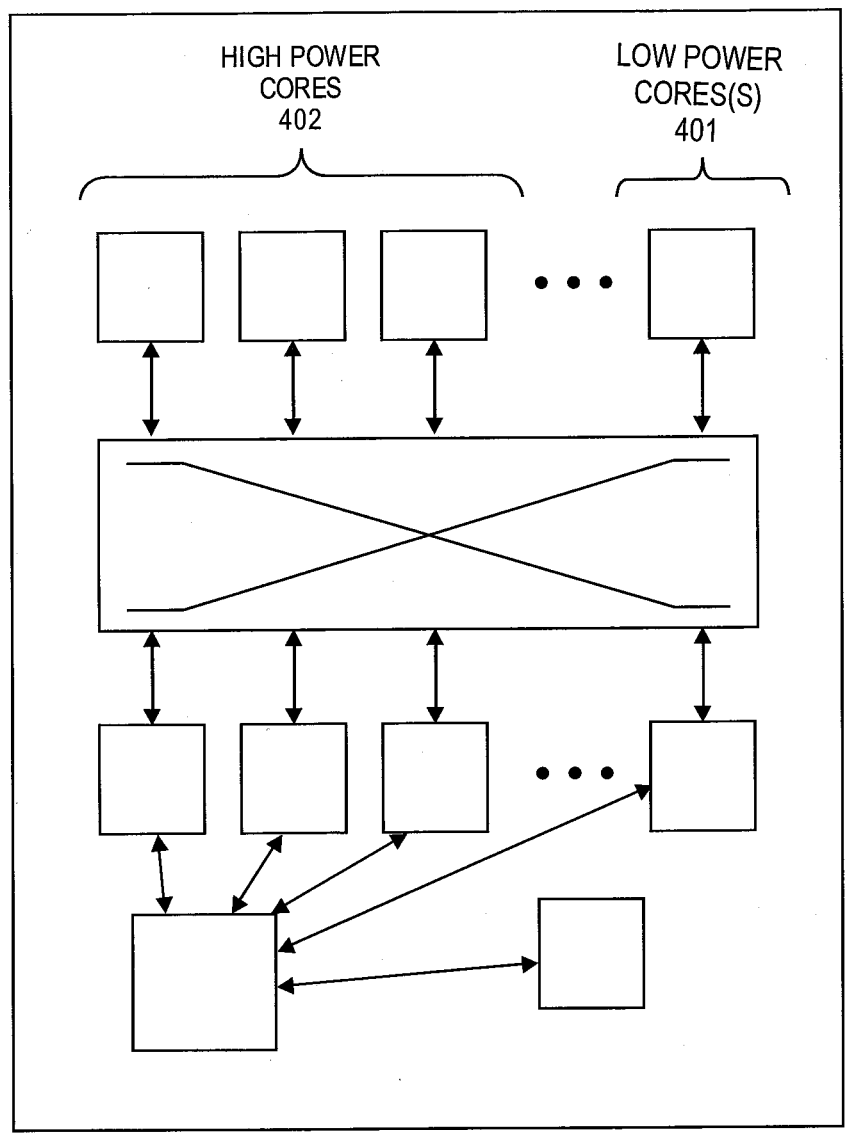
FIG. 4 shows multi core processor having high power and low power cores that support the same instruction set.

FIG. 4 depicts a new approach in which at least one of the cores 401 is designed to be lower performance and therefore consume less power than other cores 402 in the processor. However, the lower power core(s) 401 has a same logic design as the higher power core(s) 402 and therefore supports the same instruction set 403 as the high power core(s) 402. The low power core(s) 401 achieve a lower power design point by having narrower drive transistor widths than the higher power core(s) and/or having other power consumption related design features, such as any of those discussed above with respect to FIG. 3, that are oppositely oriented than the same design features in the higher power cores.

According to one approach, discussed in more detail below, when the multi-processor core is being designed, the same high level description (e.g., the same VHDL or Verilog description) is used for both the higher performance/power core(s) and the lower performance/power core(s). When the higher level descriptions are synthesized into RTL netlists, however, for the subsequent synthesis from an RTL netlist into a transistor level netlist, different technology libraries are used for the low power core(s) than the high power core(s). As alluded to above, the drive transistors of logic gates associated with the libraries used for the low power core(s) have narrower respective widths than the "same" transistors of the "same" logic gates associated with the libraries used for the high power cores.

Figure 5:
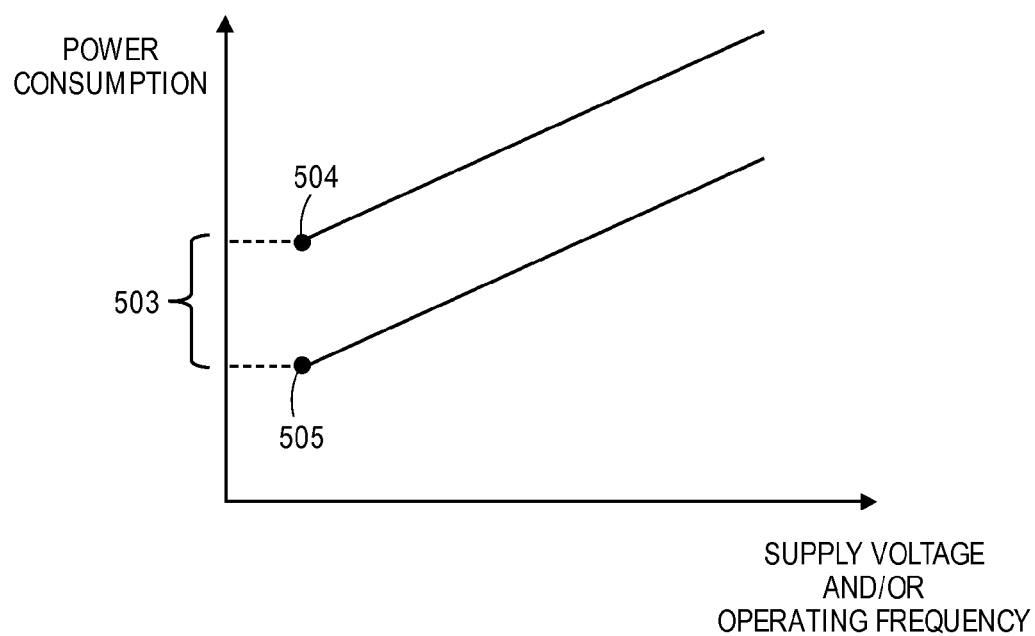
FIG. 5 compares power consumption of a high power core and low power core.

By design of the multiprocessor, referring to FIG. 5, the lower power core(s) exhibit inherently lower power consumption (and processing performance) than the higher power core(s). That is, for a same applied clock or operating frequency, because of its narrower drive transistor widths, for example, a lower power core will consume less power than a higher power core. Because of the narrower drive transistor widths, however, the lower power core has a maximum operating frequency that is less than the maximum operating frequency of the higher power core.

The import of the lower power core, however, is that the multi-processor is able to entertain a power management strategy that is the same/similar to already existing power management strategies, yet, still achieve an even lower power consumption in the lower/lowest performance/power states. Specifically, recall briefly power state 202 of FIG. 2 in which only one core is left operable (the remaining cores are disabled). Here, if the one remaining operable core is the low power core, the processor will exhibit even lower power consumption than the prior art low power state 202.

The amount of reduced power savings 503 is directly observable in FIG. 5. Here, recall that all the processors were identical in the multi-processor that was discussed with respect to the prior art low power state 202 of FIG. 2. As such, even if the supply voltage and operating voltage was reduced to a minimum, the power consumption would be that of a higher power processor (e.g., having wider drive transistor widths). This operating point is represented by point 504 of FIG. 5. By contrast, in the lowest power operating state of the improved multi-processor, if the operable core is a low power core it will consume power represented by point 505 of FIG. 5. As such, the improved processor exhibits comparatively lower power consumption at the lower/lowest performance operating states than the prior art multi-processor, while, at the same time, fully supporting the instruction set architecture the software is designed to operate on.

Figure 6:
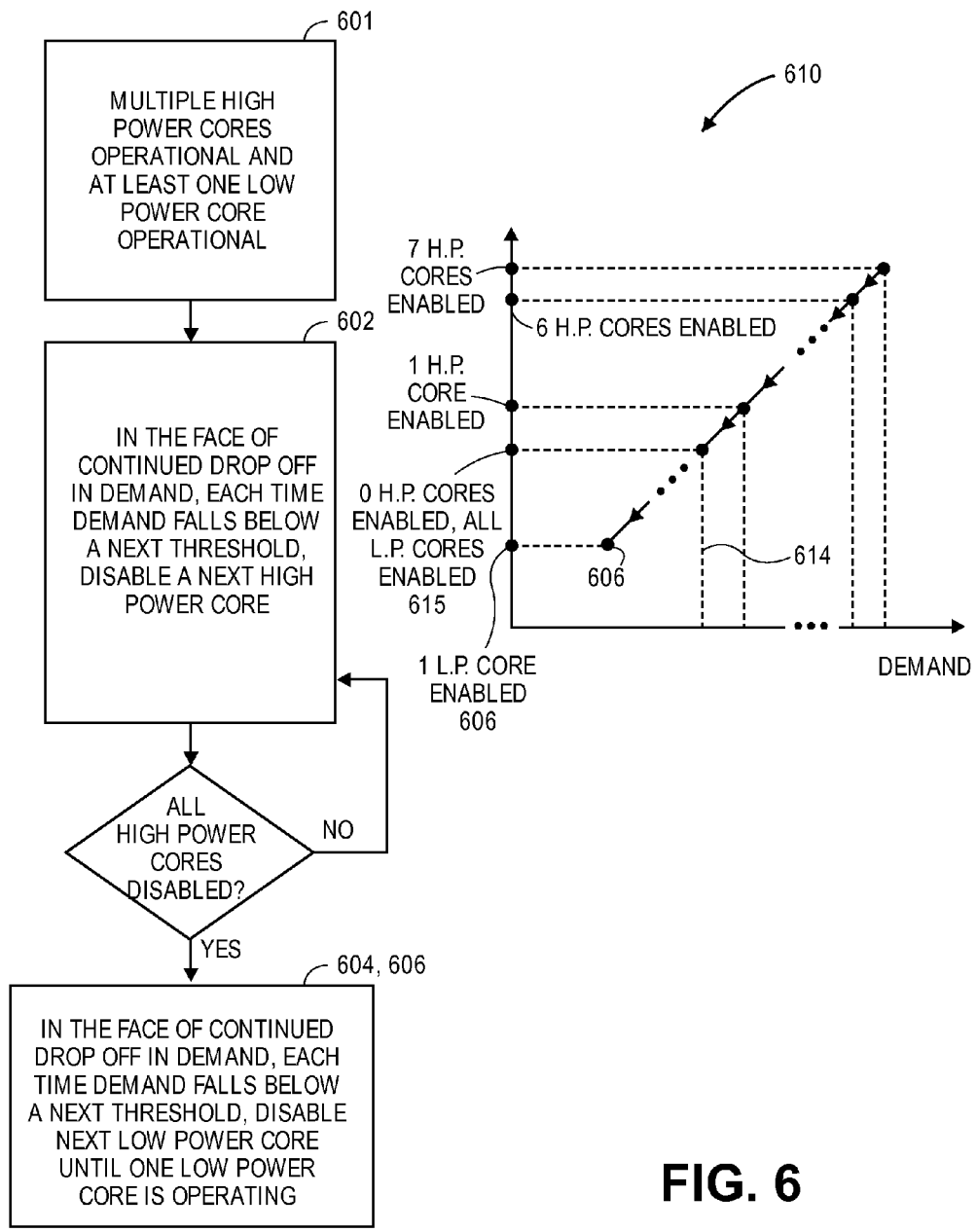
FIG. 6 shows a first power management method.

FIG. 6 shows a power management process flow that can be executed, for example, with power management software that is running on the multi-processor (or another multi-processor or separate controller, etc.). Conversely, the power management process flow of FIG. 6 can be executed entirely in hardware on the multi-processor or by some combination of such hardware and software.

According to the process flow of FIG. 6, from an initial state 601 where at least some high power processor cores and the low power core(s) are operating, in response to a continued drop in demand on the multi-processor, another high power core is disabled each time the continued drop in demand falls below some next lower threshold. For example, in a multi-processor core having sixteen cores where fourteen cores are high power cores and two cores are low power cores, the initial state 601 may correspond to a state where seven of the high power cores and both of the low power cores are operational.

In response to continued lower demand placed on the multi-processor, the seven high power cores will be disabled one by one with each new lower demand threshold 602. For instance, as observed at inset 610, demand level 611 justifies enablement of the seven high power cores and both low power cores. As the demand continually drops to a next lower threshold 612, one of the high power cores is disabled 613 leaving six operable high power cores and two low power cores.

Before the high power core is disabled, as a matter of designer choice, the core's individual operating frequency, or the operating frequency of all (or some of) the enabled high power cores, or the operating frequency of all (or some of) the enabled high power cores and the low power cores may be lowered to one or more lower operating frequency levels.

A similar designer choice exists with respect to the supply voltages applied to the cores. That is, before the high power core is disabled, as a matter of designer choice, the core's individual supply voltage, or the supply voltage of all (or some of) the enabled high power cores, or the supply voltage of all (or some of) the enabled high power cores and the low power cores may be lowered to one or more lower supply voltages. Supply voltages may be lowered in conjunction with the lowering of operating frequency, or, just one or none of these parameters may be lowered as described above.

Eventually, with the continued drop in demand, the last remaining high power core will be disabled 615 after demand falls below some lower threshold 614. This leaves only the low power cores in operation. Operating frequency and/or supply voltage of the low power core(s) may likewise be lowered as demand continues to drop beneath level 614. With continued drop in demand a similar process of disabling cores as demand falls below each next lower demand threshold 604 continues until the multi-processor core is left with only one low power core remaining as its sole operating core 606.

State 606 is reached of course with the disablement of the last high power core in implementations where the processor only has one lower power core. Again supply voltage and/or operating frequency of the sole remaining low power core may be lowered as demand continues to fall. Importantly, in state 606, as discussed above, the multi-processor will exhibit lower power consumption than other multi-processor cores having an identical power management scheme but whose constituent cores are all high power cores. Even lower power consumption can be provided for in state 606 if the sole operating low power core is provided with a lower supply voltage and/or lower operating frequency that the lowest operating supply voltage and/or operating frequency applied to the high power cores.

No special adjustment needs to be made by or for application software, virtual machine or virtual machine monitor when the system is running only on the low power core(s) after all the high power cores are disabled. Again, the preservation of the same instruction core across all cores in the system corresponds to transparency from the software's perspective as to the underlying cores. Lower performance may be recognized with lower cores but no special adjustments as to the content of the instruction streams should be necessary. In various alternate implementations: 1) the hardware/machine readable firmware can monitor and control the core mix; or, 2) the hardware can relinquish control to the Operating system and let it monitor the demand and control the core mix.

Figure 7:
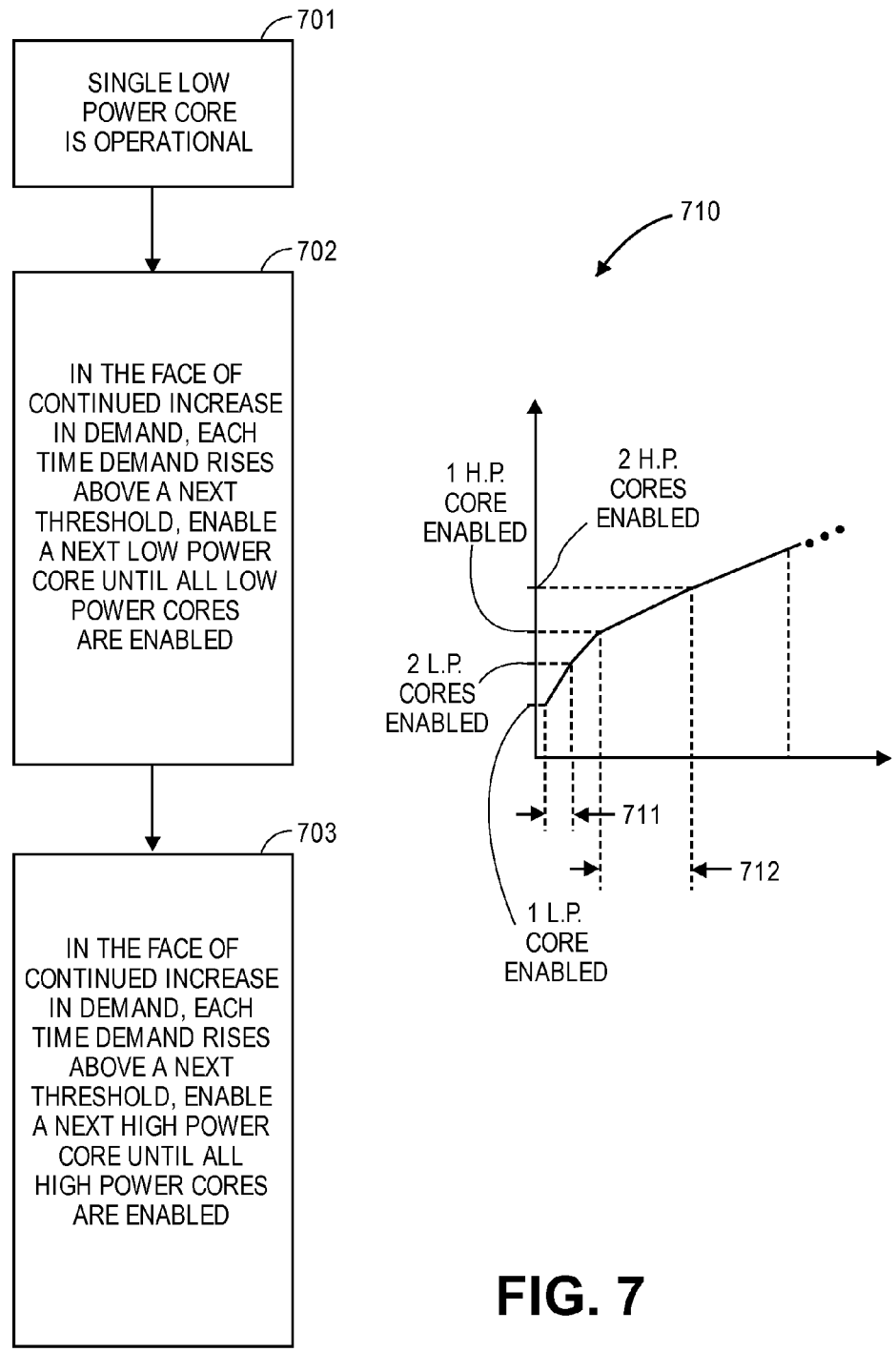
FIG. 7 shows a second power management method.

FIG. 7 shows essentially a reverse of the processes described above. As observed in FIG. 7, starting from a state in which only a single low power core is operating 701 additional low power cores are enabled (if any more) 702 as demand on the multi-processor continually increases. Eventually, high power cores are enabled 703. Notably, the demand threshold needed to enable a next processor from an operating low power processor may correspond to a lower demand increment than the demand threshold needed to enable to a next processor from an operating high power processor.

That is, inset 710 shows the increase in demand 711 needed after a low power processor is first enabled to trigger the enablement of a next processor in the face of increased demand. The increase in demand 712 needed after a high power processor is first enabled to trigger enablement of a next high power processor in the face of increased demand is greater than the aforementioned demand 711. This is so because a high power processor is able to handle more total demand than a low power processor and therefore does not need to have additional "help" as soon as a low power processor does.

Operating frequency and/or supply voltage may also be increased in conjunction with the enablement of cores in the face of increased demand in a logically inverse manner to that discussed above with respect to the disablement of cores.

Figure 8:
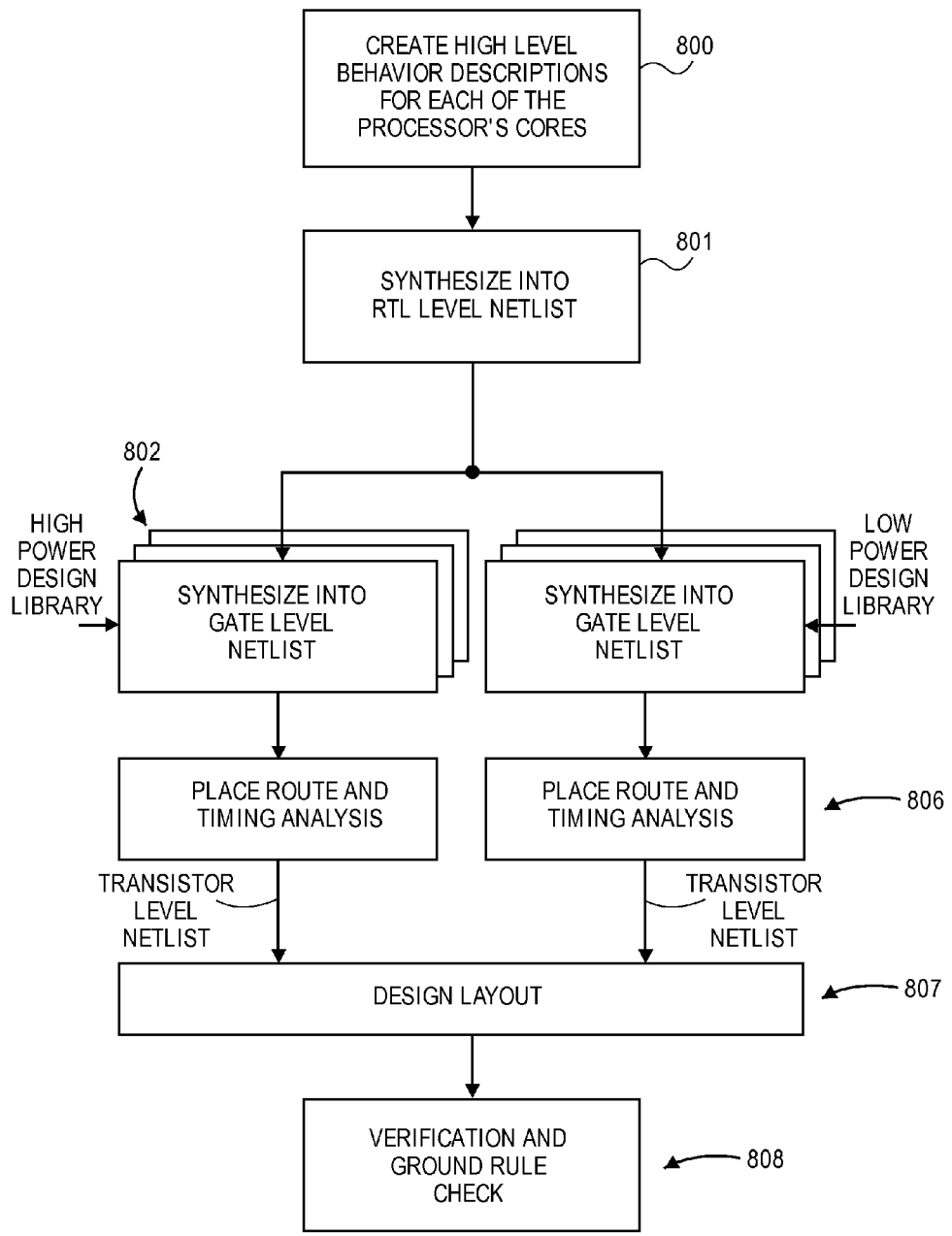
FIG. 8 shows a design method.

FIG. 8 shows a design process for designing a multi-core processor consistent with the principles discussed above. As part of the design process, high level behavioral descriptions 800 (e.g., VHDL or Verilog descriptions) for each of the processor's cores are synthesized into a Register Transfer Level (RTL) netlist 801. The RTL netlist is synthesized 802 into corresponding higher power core gate level netlist(s) (one for each high power ore) with libraries corresponding to a higher power/performance design (such as logic circuits having wider drive transistors). The RTL netlist is also synthesized 803 into corresponding lower power core gate level netlist(s) (one for each low power core) with libraries corresponding to a lower power/performance design (such as logic circuits having wider drive transistors). Here, the logic designs for the high power and low power cores are the same but the design of their corresponding logic circuits have different performance/power design points.

The transistor level netlists for the respective cores are then used as a basis for performing a respective place, route and timing analysis 806 and design layout 807. Here, the lower power/performance cores may have more relaxed placement and timing guidelines owing to the larger permissible propagation delay through and between logic circuits. Said another way, recalling from the discussion of FIG. 3 that longer load lines result in slower rise and fall times, the lower performance cores may permit longer load lines between transistors and gates because these cores are designed to have slower operation (of course, if load lines are increased to much along with the inclusion of narrower drive transistors, the drop in performance may be more than desired).

Upon completion of the layout and timing analysis, the cores are cleared for manufacture upon a clean manufacturing ground rule check 808.

Processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.)), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., Java, C#, VB, Python, C, C++, J#, APL, Cobol, Fortran, Pascal, Pert, etc.) supported by various software development frameworks (e.g., Microsoft Corporation's .NET, Mono, Java, Oracle Corporation's Fusion, etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.) or may be compiled directly into object code.

According to various approaches the abstract execution environment may convert the intermediate form program code into processor specific code by, 1) compiling the intermediate form program code (e.g., at run-time (e.g., a JIT compiler)), 2) interpreting the intermediate form program code, or 3) a combination of compiling the intermediate form program code at run-time and interpreting the intermediate form program code. Abstract execution environments may run on various operating systems (such as UNIX, LINUX, Microsoft operating systems including the Windows family, Apple Computers operating systems including MacOS X, Sun/Solaris, OS/2, Novell, etc.).

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

In the foregoing specification, the invention has been described with reference to specific exemplary embodiments thereof. It will, however, be evident that various modifications and changes may be made thereto without departing from the broader spirit and scope of the invention as set forth in the appended claims.

What is claimed is:

1. A multi-core processor comprising:
a first plurality of cores and a second plurality of cores that support a same instruction set, wherein the second plurality of cores consume less power, for a same applied operating frequency and supply voltage, than the first plurality of cores; and
power management hardware to, from an initial state where the first plurality of cores and the second plurality of cores are enabled, disable an additional core of the first plurality of cores for each continued drop in demand below a next lower threshold without disabling any of the second plurality of cores until the first plurality of cores is disabled, disable an additional core of the second plurality of cores for each continued drop in demand below a next lower threshold until one core of the second plurality of cores remains enabled, and lower at least one of an operating frequency and a supply voltage of the one core of the second plurality of cores as demand drops below a next lower threshold.

2. The multi-core processor of claim 1 wherein the second plurality of cores include logic gates that have narrower logic gate driver transistors than a corresponding logic gate of the first plurality of cores.

3. The multi-core processor of claim 1 wherein the second plurality of cores comprise logic gates that consume less power than a corresponding logic gate of the first plurality of cores.

4. The multi-core processor of claim 1 wherein the second plurality of cores each have a maximum operating frequency that is less than a maximum operating frequency of the first plurality of cores.

5. The multi-core processor of claim 1 further comprising a switch fabric between the first plurality of cores, the second plurality of cores, and a system memory interface.

6. A method comprising:
operating a multi-core processor such that a first plurality of cores and a second plurality of cores support respective software routines with a same instruction set, the first plurality of cores being higher performance and consuming more power than the second plurality of cores under a same applied supply voltage and operating frequency; and
disabling with power management hardware, from an initial state where the first plurality of cores and the second plurality of cores are enabled, an additional core of the first plurality of cores for each continued drop in demand below a next lower threshold without disabling any of the second plurality of cores until the first plurality of cores is disabled, disabling an additional core of the second plurality of cores for each continued drop in demand below a next lower threshold until one core of the second plurality of cores remains enabled, and lowering at least one of an operating frequency and a supply voltage of the one core of the second plurality of cores as demand drops below a next lower threshold.

7. The method of claim 6 wherein the operating of the first plurality of cores includes driving load lines with wider transistor widths than corresponding transistor widths in said second plurality of cores.

8. The method of claim 6 further comprising lowering at least one of a supply voltage and an operating frequency of said one core in response to lower demand being offered to said multi-core processor.

9. The method of claim 8 further comprising raising at least one of a supply voltage and an operating frequency of said one core in response to higher demand being offered to said multi-core processor.

10. The method of claim 6 further comprising:
raising at least one of a supply voltage and an operating frequency of said one core in response to higher demand being offered to said multi-core processor.

11. A non-transitory machine readable medium containing program code that when processed by a machine causes a method to be performed, the method comprising:
operating a multi-core processor such that a first plurality of cores and a second plurality of cores support respective software routines with a same instruction set, the first plurality of cores being higher performance and consuming more power than a second plurality of cores under a same applied supply voltage and operating frequency; and
disabling with power management hardware, from an initial state where the first plurality of cores and the second plurality of cores are enabled, an additional core of the first plurality of cores for each continued drop in demand below a next lower threshold without disabling any of the second plurality of cores until the first plurality of cores is disabled, disabling an additional core of the second plurality of cores for each continued drop in demand below a next lower threshold until one core of the first plurality of cores remains enabled, and lowering at least one of an operating frequency and a supply voltage of the one core of the second plurality of cores as demand drops below a next lower threshold.

12. The non-transitory machine readable medium of claim 11 wherein said method further comprises lowering at least one of a supply voltage and an operating frequency of said one core in response to lower demand being offered to said multi-core processor.

13. The non-transitory machine readable medium of claim 12 wherein said method further comprises raising at least one of a supply voltage and an operating frequency of said one core in response to higher demand being offered to said multi-core processor.

14. The non-transitory machine readable medium of claim 11 wherein said method further comprises raising at least one of a supply voltage and an operating frequency of said one core in response to higher demand being offered to said multi-core processor.

15. The multi-core processor of claim 1 wherein the power management hardware is to lower at least one of a supply voltage and an operating frequency of each additional core to a lower operating level before disablement.

16. The multi-core processor of claim 1 wherein the power management hardware is to enable an additional core of the second plurality of cores for each continued increase in demand above a next higher threshold without enabling any of the first plurality of cores until the second plurality of cores is enabled, and enable an additional core of the first plurality of cores for each continued increase in demand above a next higher threshold until the first plurality of cores is also enabled.

17. The multi-core processor of claim 1 wherein the power management hardware is to lower at least one of a supply voltage and an operating frequency of said one core in response to lower demand.

18. The multi-core processor of claim 1 wherein the power management hardware is to raise at least one of a supply voltage and an operating frequency of said one core in response to higher demand.

19. The method of claim 6 further comprising lowering at least one of a supply voltage and an operating frequency of each additional core to a lower operating level before disablement.

20. The non-transitory machine readable medium of claim 11 wherein said method further comprises lowering at least one of a supply voltage and an operating frequency of each additional core to a lower operating level before disablement.

* * * * *